United States Patent
Chen et al.

(10) Patent No.: US 12,122,079 B2
(45) Date of Patent: Oct. 22, 2024

(54) HIDDEN RUNNER INJECTION MOLD STRUCTURE

(71) Applicant: DELL PRODUCTS L.P., Round Rock, TX (US)

(72) Inventors: Yuanming Chen, Shanghai (CN); Yonghong Duan, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/952,680

(22) Filed: Sep. 26, 2022

(65) Prior Publication Data

US 2024/0066772 A1   Feb. 29, 2024

(30) Foreign Application Priority Data

Aug. 30, 2022 (CN) .......................... 202211051479.2

(51) Int. Cl.
| | |
|---|---|
| *B29C 45/27* | (2006.01) |
| *B29C 45/14* | (2006.01) |
| *B29C 45/40* | (2006.01) |
| *B29C 45/73* | (2006.01) |
| B29K 307/04 | (2006.01) |
| B29L 31/34 | (2006.01) |

(52) U.S. Cl.
CPC .... *B29C 45/2701* (2013.01); *B29C 45/14786* (2013.01); *B29C 45/40* (2013.01); *B29C 45/73* (2013.01); *B29K 2307/04* (2013.01); *B29K 2905/00* (2013.01); *B29L 2031/34* (2013.01)

(58) Field of Classification Search
CPC ... B29C 45/26; B29C 45/14; B29C 45/14008; B29C 45/14122; B29C 2045/1841; B29C 45/27; B29C 45/2701; B29C 45/64
See application file for complete search history.

(56) References Cited

U.S. PATENT DOCUMENTS

| | | | |
|---|---|---|---|
| 2012/0177772 A1* | 7/2012 | Judd | ....................... B29C 45/00 156/247 |
| 2013/0052465 A1* | 2/2013 | Shen | ................... B29C 45/0001 425/129.1 |
| 2017/0217056 A1 | 8/2017 | Abbatiello et al. | |
| 2019/0337205 A1* | 11/2019 | Jain | ....................... B33Y 80/00 |
| 2022/0167516 A1 | 5/2022 | Abbatiello et al. | |

* cited by examiner

*Primary Examiner* — Yunju Kim
(74) *Attorney, Agent, or Firm* — Larson Newman, LLP

(57) ABSTRACT

An injection mold structure includes a main portion, a core plate, multiple runners, a removable metal plate, a top portion, a resin mold. The core plate is in physical communication with and located within the main portion. The removable metal plate is in physical communication with the runners and the core plate. The runners are located in between the core plate and the removable metal plate. The top portion includes a cavity to receive a carbon fiber plate.

15 Claims, 4 Drawing Sheets

HIDDEN RUNNER INJECTION MOLD STRUCTURE

FIELD OF THE DISCLOSURE

The present disclosure generally relates to information handling systems, and more particularly relates to a hidden runner injection mold structure.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs, and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An injection mold structure includes a main portion, a core plate, multiple runners, a removable metal plate, a top portion, a resin mold. The core plate is in physical communication with and located within the main portion. The removable metal plate is in physical communication with the runners and the core plate. The runners are located in between the core plate and the removable metal plate. The top portion includes a cavity to receive a carbon fiber plate.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
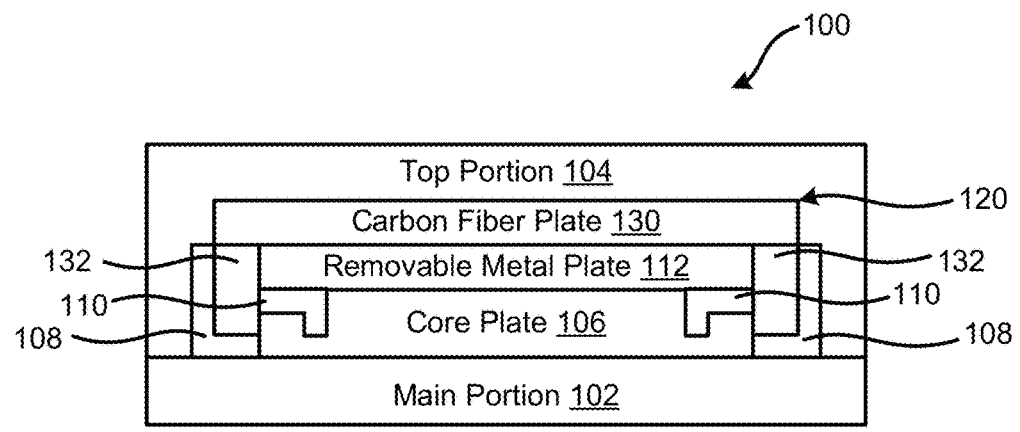
FIG. 1 is block diagram of a hidden runner injection mold structure according to at least one embodiment of the present disclosure.
Figure 2:
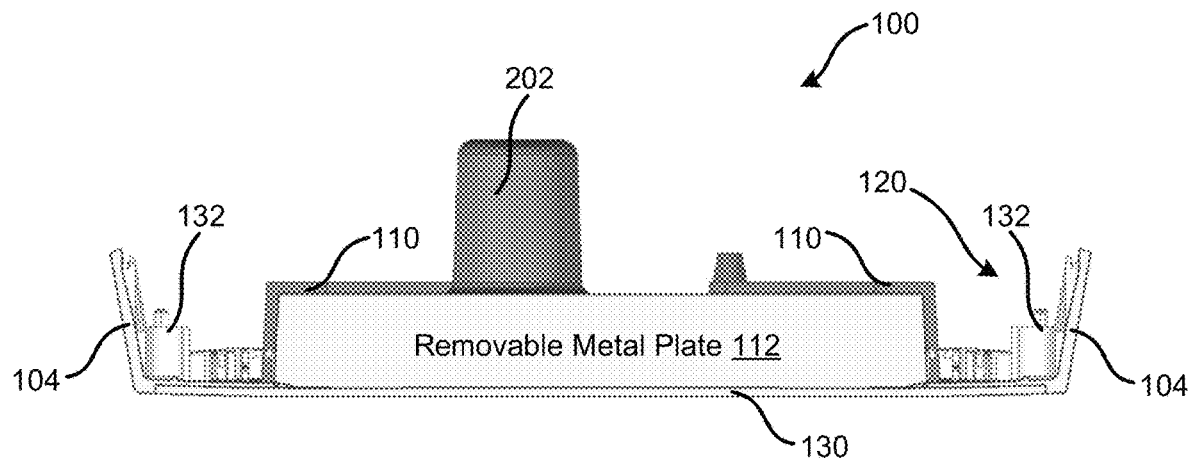
FIG. 2 is a diagram of a hidden runner injection mold structure according to at least one embodiment of the present disclosure.

FIGS. 1-2 illustrate a portion of a hidden runner injection mold structure 100 for an information handling system according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), blade server or rack server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Injection mold structure 100 includes a main portion 102, a top portion 104, a core plate 106, a resin mold 108, multiple runners 110, and a removable metal plate 112. Top portion includes a cavity 120 to receive a carbon fiber plate 130. As shown in FIG. 1, both of core plate 106 and resin mold 108 may be in physical communication with main portion 102. In an example, core plate 106 and resin mold 108 may be securely mounted on main portion 102, such that the core plate and resin mold are not removable from the main portion.

FIG. 1 illustrates injection mold structure 100 in a closed position with top portion 104 securely connected with main portion 102. In the closed position top portion 104 may form a seal with bottom portion 102, such that resin 132 may be injected into injection mold structure 100 without leaking and directed to resin mold 120 via runners 110. As the injected resin 132 cools, the resin may adhere to carbon fiber plate to form a final product. Top portion 104 may be held in physical communication with main portion 102 for any suitable predetermined amount of time to enable resin 132 to harden.

Referring to FIG. 2, removable metal plate 112 includes an alignment post 202. In certain examples, removable metal plate 112 may include any suitable number of alignment posts 202 without varying from the scope of this disclosure as described with respect to FIG. 3.

Figure 3:
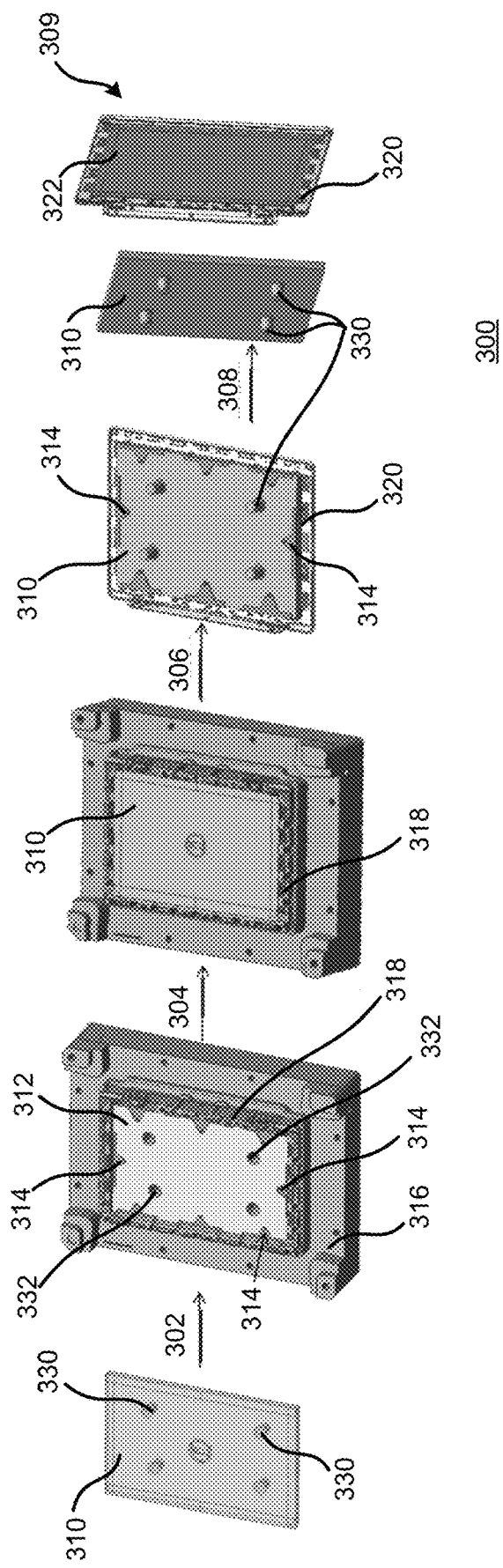
FIG. 3 is a diagram of a sequence of steps to create an injection mold component with a hidden runner injection mold structure according to at least one embodiment of the present disclosure.

FIG. 3 illustrates a sequence 300 of processes 302, 304, 306, and 308 to create a final component 309 via a hidden runner injection mold structure, such as injection mold structure 100 of FIGS. 1 and 2, according to at least one embodiment of the present disclosure. Any suitable components may be utilized to create the final component 309 including, but not limited to, a removable metal plate 310, a core plated 312, multiple runners 314, a main portion 316, and a resin mold 318. Final component 309 incudes a resin portion or structure 320 and a carbon fiber plate 322.

Removable metal plate 310 includes multiple alignment posts 330, which may be inserted within alignment holes 332 of core plate 312. At process 302, removable metal plate 310 is placed in physical communication with core plate 312 and runners 314. In an example, alignment posts 330 may be inserted within alignment holes 332 to ensure that removable metal plate 310 is placed in a proper position with respect to core plate 312, runners 314, main portion 316, and resin mold 318.

After removable metal plate 310 is placed in physical communication with core plate 312, a top portion of the injection mold structure may be placed in physical communication with the removable metal plate. In an example, the top portion may include a cavity, which in turn may hold carbon fiber plate 322 for final component 309. The top portion may create a seal with main portion 316 so that resin may be injected into the injection mold structure.

During process 304, resin is injected into the injection mold structure. In an example, the resin may be injected into the resin mold of the injection mold structure via runners 314 in physical communication with removable metal plate 310 and core plate 312. In certain examples, runners 314 may direct the flow of resin into different portions of resin mold 318. After the resin is injected into resin mold 318, the top portion may be held on the main portion for any suitable length of time.

During process 306, removable metal plate 310, runners 314, resin structure 320, and carbon fiber plate 322 may be released/removed from core plate 312 of the injection mold structure. In an example, removable metal plate 310 may be held in physical communication with and resin structure 320 carbon fiber plate 322 after these components have been removed from the injection mold structure. In response to the metal plate 310, runners 314, resin structure 320, and carbon fiber plate 322 being removed from core plate 312, the metal plate and other components may be cooled. In certain examples, removable metal plate 310 may prevent warping of resin structure 320 and carbon fiber 322 while the resin structure is cooling down from the injection process. Based on removable metal plate 310 being held in physical communication with resin structure 320 and carbon fiber 322 during the cooling process, final component 309 will not need to be reshaped as needed in previous manufacturing processes.

During process 308, removable metal plate 310 is heated, such that the removable metal plate and runners 314 may be removed from resin structure 320 and carbon fiber plate 322. In an example, the heating of removable metal plate 310 may cause runners 314 to stick to the metal plate so the runners may be easily removed from resin structure 320 and core plate 322. Runners 314 may then be removed from metal plate 310 so that the removable metal plate may be used in another process sequence 300.

Figure 4:
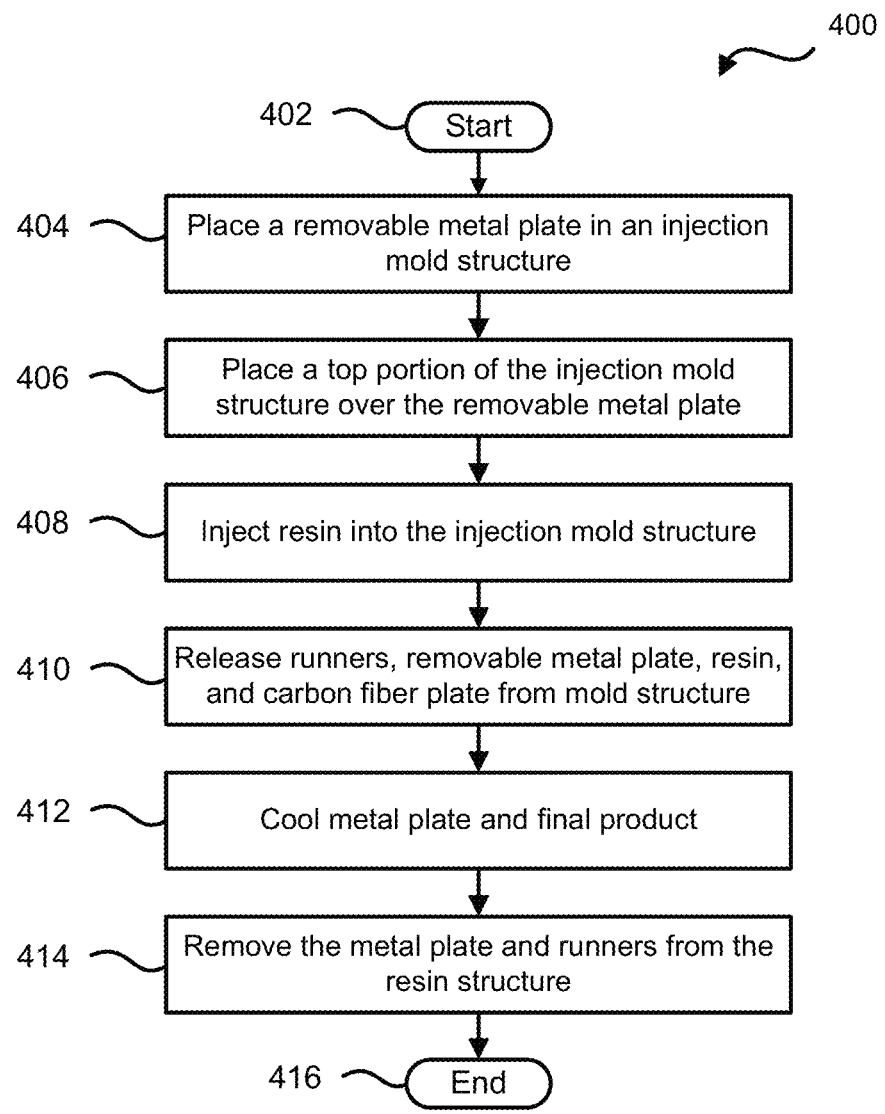
FIG. 4 is a flow diagram of a method for performing an injection mold with a hidden runner according to at least one embodiment of the present disclosure.

FIG. 4 is a flow diagram of a method 400 for performing an injection mold with a hidden runner according to at least one embodiment of the present disclosure, starting at block 402. It will be readily appreciated that not every method step set forth in this flow diagram is always necessary, and that certain steps of the methods may be combined, performed simultaneously, in a different order, or perhaps omitted, without varying from the scope of the disclosure.

At block 404, a removable metal plate is placed in an injection mold structure. In an example, the injection mold structure includes a main portion, a core plate, multiple runners, and a resin mold. In certain examples, the removable metal plate may be placed in physical communication with the core plate and the runners. The removable metal plate may include one or more alignment pins/posts, which in turn may align with and insert within one or more alignment holes of the core plate.

At block 406, a top portion of the injection mold structure is placed in physical communication with the removable metal plate. In an example, the top portion may include a cavity, which in turn may hold a carbon fiber plate for a component to be created via the injection mold structure. The top portion may create a seal with the main portion so that resin may be injected into the injection mold structure.

At block 408, resin is injected into the injection mold structure. In an example, the resin may be injected into the resin mold of the injection mold structure via the multiple runners in physical communication with the core plate and the removable metal plate. In certain examples, the runners may direct the flow of resin into different portions of the resin mold. After the resin is injected into the resin mold of the injection mold structure, the top portion may be held on the main portion for any suitable length of time.

At block 410, the runners, removable metal plate, resin structure, and carbon fiber plate may be released/removed from the injection mold structure. At block 412, the metal plate and a final component are cooled. In an example, the removable metal plate may be held in physical communication with the carbon fiber plate and the resin structure while these components are being cooled. In an example, the metal plate may hold and support the plastic in whole cooling phase and prevent plastic shrinkage to reduce part deformation. In certain examples, the removable metal plate may prevent warping of the carbon fiber and resin structure while the resin structure is cooling down from the injection process.

At block 414, the metal plate and the runners are removed from the resin structure and the core plate and the flow ends at block 416. In an example, the metal plate may be heated to cause the runners to stick to the metal plate so the runners may be easily removed from the resin structure and the carbon fiber plate.

Figure 5:
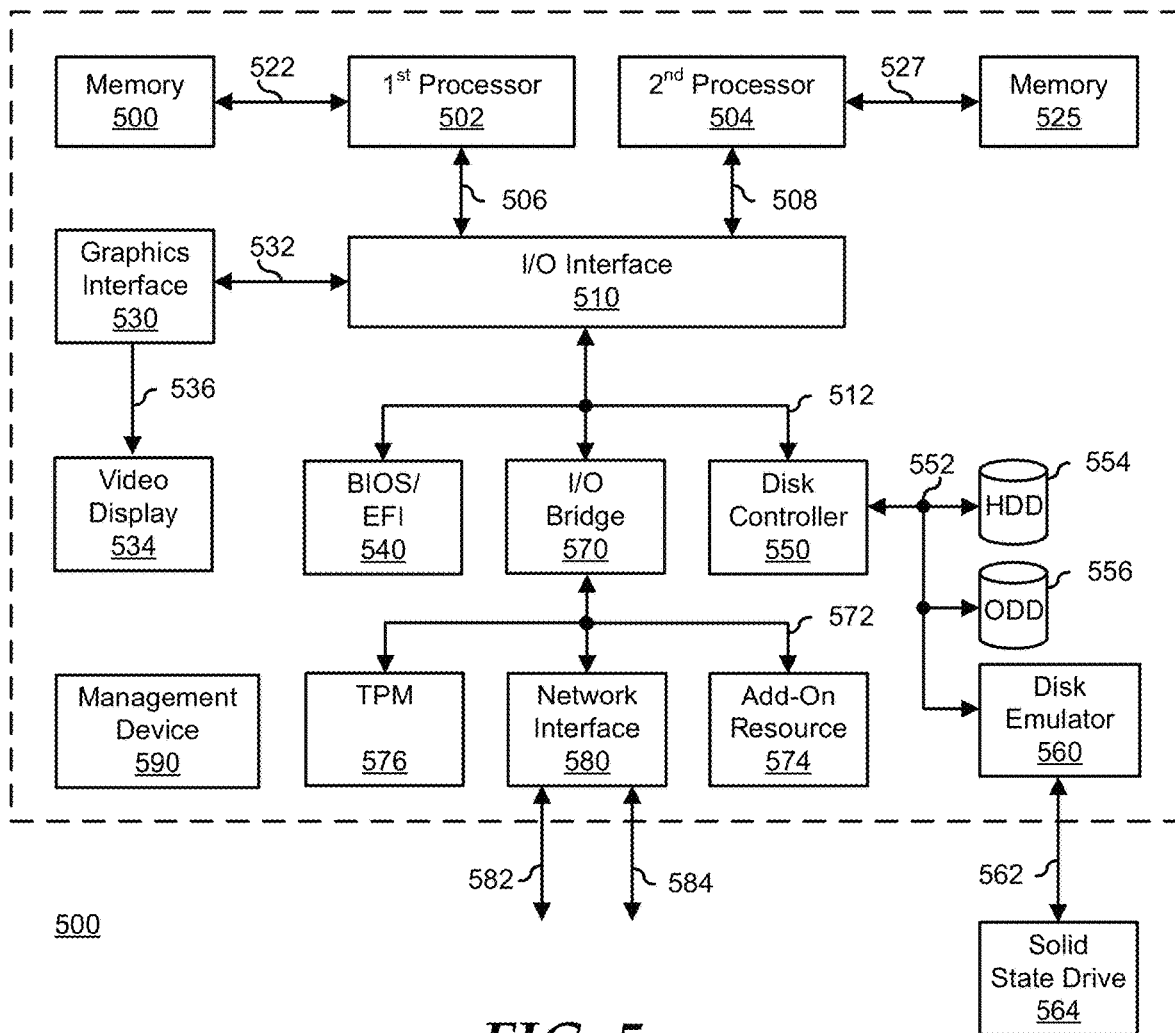
FIG. 5 is a block diagram of a general information handling system according to an embodiment of the present disclosure.

FIG. 5 shows a generalized embodiment of an information handling system 500 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described below and operates to perform one or more of the methods described below. Information handling system 500 includes a processors 502 and 504, an input/output (I/O) interface 510, memories 520 and 525, a graphics interface 530, a basic input and output system/universal extensible firmware interface (BIOS/UEFI) module 540, a disk controller 550, a hard disk drive (HDD) 554, an optical disk drive (ODD) 556, a disk emulator 560 connected to an external solid state drive (SSD) 562, an I/O bridge 570, one or more add-on resources 574, a trusted platform module (TPM) 576, a network interface 580, a management device 590, and a power supply 595. Processors 502 and 504, I/O interface 510, memory 520, graphics interface 530, BIOS/UEFI module 540, disk controller 550, HDD 554, ODD 556, disk emulator 560, SSD 562, I/O bridge 570, add-on resources 574, TPM 576, and network interface 580 operate together to provide a host environment of information handling system 500 that operates to provide the data processing functionality of the information handling system. The host environment operates to execute machine-executable code, including platform BIOS/UEFI code, device firmware, operating system code, applications, programs, and the like, to perform the data processing tasks associated with information handling system 500.

In the host environment, processor 502 is connected to I/O interface 510 via processor interface 506, and processor 504 is connected to the I/O interface via processor interface 508. Memory 520 is connected to processor 502 via a memory interface 522. Memory 525 is connected to processor 504 via a memory interface 527. Graphics interface 530 is connected to I/O interface 510 via a graphics interface 532 and provides a video display output 536 to a video display 534. In a particular embodiment, information handling system 500 includes separate memories that are dedicated to each of processors 502 and 504 via separate memory interfaces. An example of memories 520 and 525 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 540, disk controller 550, and I/O bridge 570 are connected to I/O interface 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 510 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 540 includes BIOS/UEFI code operable to detect resources within information handling system 500, to provide drivers for the resources, initialize the resources, and access the resources. BIOS/UEFI module 540 includes code that operates to detect resources within information handling system 500, to provide drivers for the resources, to initialize the resources, and to access the resources.

Disk controller 550 includes a disk interface 552 that connects the disk controller to HDD 554, to ODD 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits SSD 564 to be connected to information handling system 500 via an external interface 562. An example of external interface 562 includes a USB interface, an IEEE 3394 (Firewire) interface, a proprietary interface, or a combination thereof. Alternatively, solid-state drive 564 can be disposed within information handling system 500.

I/O bridge 570 includes a peripheral interface 572 that connects the I/O bridge to add-on resource 574, to TPM 576, and to network interface 580. Peripheral interface 572 can be the same type of interface as I/O channel 512 or can be a different type of interface. As such, I/O bridge 570 extends the capacity of I/O channel 512 when peripheral interface 572 and the I/O channel are of the same type, and the I/O bridge translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as I/O interface 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Management device 590 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 500. In particular, management device 590 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 500, such as system cooling fans and power supplies. Management device 590 can include a network connection to an external management system, and the management device can communicate with the management system to report status information for information handling system 500, to receive BIOS/UEFI or system firmware updates, or to perform other task for managing and controlling the operation of information handling system 500.

Management device 590 can operate off of a separate power plane from the components of the host environment so that the management device receives power to manage information handling system 500 when the information handling system is otherwise shut down. An example of management device 590 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 590 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An injection mold structure comprising:
   a main portion;
   a core plate in physical communication with and located within the main portion, the core plate securely mounted on the main portion and the core plate not removable from the main portion;
   a removable metal plate in physical communication with the core plate;
   a plurality of runners including first and second runners, the runners mounted on the removable metal plate, wherein the runners are located in between the core plate and the removable metal plate, wherein a first portion of a first runner is inserted within a first slot of the core plate and a second portion of a second runner is inserted within a second slot of the core plate;
   a top portion including a cavity; and
   a resin mold in physical communication with and located within the cavity of the top portion, the resin mold securely mounted on the main portion and the resin mold not removable from the main portion, wherein a carbon fiber plate is placed in physical communication with the resin mold and within the cavity of the top portion.

2. The injection mold structure of claim 1, wherein the removable metal plate includes one or more alignment posts, the core plate includes one or more alignment holes, and the alignment post align with and insert within the alignment holes.

3. The injection mold structure of claim 1, wherein the top portion creates a seal with the main portion so that resin may be injected into the injection mold structure.

4. The injection mold structure of claim 1, wherein the runners direct a flow of resin into different portions of the resin mold to create a resin structure.

5. The injection mold structure of claim 4, wherein the runners, the removable metal plate, the resin structure, and the carbon fiber plate are released from the main portion a predetermined amount time after the flow of resin has ended.

6. The injection mold structure of claim 5, wherein the physical communication of the removable metal plate with both the resin structure and the carbon fiber plate prevents warping of the carbon fiber and resin structure while the resin structure is cooling down.

7. The injection mold structure of claim 1, wherein the runners stick to the removable metal plate based on the removable metal plate being heated.

8. The injection mold structure of claim 1, wherein the runners are removed from the core plate at a same time as the removable metal plate.

9. An injection mold structure comprising:
   a main portion;
   a core plate in physical communication with and located within the main portion, the core plate securely mounted on the main portion and the core plate not removable from the main portion, wherein the core plate includes one or more alignment holes;
   a removable metal plate in physical communication with the core plate, wherein the removable metal plate includes one or more alignment posts and the alignment post align with and insert within the alignment holes;
   a plurality of runners including first and second runners, the runners mounted on the removable metal plate, wherein the runners are located in between the core plate and the removable metal plate, wherein a first portion of a first runner is inserted within a first slot of the core plate and a second portion of a second runner is inserted within a second slot of the core plate;
   a top portion including a cavity, wherein the top portion creates a seal with the main portion so that resin may be injected into the injection mold structure; and a resin mold in physical communication with and located within the cavity of the top portion, the resin mold securely mounted on the main portion and the resin mold not removable from the main portion, wherein a carbon fiber plate is placed in physical communication with the resin mold and within the cavity of the top portion.

10. The injection mold structure of claim 9, wherein the runners direct a flow of resin into different portions of the resin mold to create a resin structure.

11. The injection mold structure of claim 10, wherein the runners, the removable metal plate, the resin structure, and the carbon fiber plate are released from the main portion a predetermined amount time after the flow of resin has ended.

12. The injection mold structure of claim 11, wherein the physical communication of the removable metal plate with both the resin structure and the carbon fiber plate prevents warping of the carbon fiber and resin structure while the resin structure is cooling down.

13. The injection mold structure of claim 9, wherein the runners stick to the removable metal plate based on the removable metal plate being heated.

14. The injection mold structure of claim 13, wherein the runners are removed from the core plate at a same time as the removable metal plate.

15. The injection mold structure of claim 9, wherein the top portion is held in physical communication with the main portion for a predetermined amount of time after the resin is injected into the injection mold structure.

* * * * *